US005173688A

United States Patent [19]

DeLuca et al.

[11] Patent Number: 5,173,688

[45] Date of Patent: Dec. 22, 1992

[54] PAGER WITH DISPLAY UPDATEABLE BY INCOMING MESSAGE

[75] Inventors: Joan S. DeLuca, Boca Raton; Amy R. Kabcenell, Highland Beach; John Schwendeman, Pompano Beach, all of Fla.

[73] Assignee: Motorola, Inc., Schaumburg, Ill.

[21] Appl. No.: 747,403

[22] Filed: Aug. 19, 1991

Related U.S. Application Data

[63] Continuation of Ser. No. 459,853, Jan. 2, 1990, abandoned.

[51] Int. Cl.[5] .............................................. H04B 7/00

[52] U.S. Cl. ............................. 340/825.44; 340/311.1

[58] Field of Search ...................... 340/825.26, 825.27, 340/825.44, 825.47, 825.48, 311.1; 379/56, 57; 370/94.1

[56] References Cited

U.S. PATENT DOCUMENTS

| | | | |
|---|---|---|---|
| 4,449,114 | 5/1984 | Fascenda et al. | 273/86 R |
| 4,473,824 | 9/1984 | Claytor | 340/825.27 |
| 4,742,516 | 5/1988 | Yamaguchi | 370/94.1 |
| 4,769,641 | 9/1988 | Yoshizawa et al. | |
| 4,845,491 | 7/1989 | Fascenda et al. | 340/825.47 |
| 5,045,848 | 9/1991 | Fascenda | 340/825.26 |
| 5,049,874 | 9/1991 | Ishide et al. | 340/825.26 |
| 5,087,905 | 2/1992 | Kuramatsu et al. | 340/311.1 |

FOREIGN PATENT DOCUMENTS

| | | | |
|---|---|---|---|
| 2191069 | 12/1987 | United Kingdom | 340/825.26 |
| 8809104 | 11/1988 | World Int. Prop. O. | 340/825.27 |

*Primary Examiner*—Donald J. Yusko
*Assistant Examiner*—Dervis Magistre
*Attorney, Agent, or Firm*—Daniel R. Collopy; William E. Koch; Thomas G. Berry

[57] ABSTRACT

A selective call receiver, such as a pager, stores an incoming message without interrupting the operation of the receiver. One set of data items displayed on a display of the receiver is updated independent of another set of data items. The updating function allows for the display of display formats such as forms and tables, wherein only the information needed to fill in the table is transmitted, the header information being retained from one update to the next.

14 Claims, 8 Drawing Sheets

| DATA FIELD ID | FORMAT | HEADER INFO |
|---|---|---|
| 1 | 1.9 | MIA/NY |
| 2 | 1.9 | METS/REDS |
| | | |

| DATA FIELD ID | FORMAT | HEADER INFO |
|---|---|---|
| 1 | +1 | 30/12 |
| 2 | +1 | _8/11 |
| | | |

PAGER WITH DISPLAY UPDATEABLE BY INCOMING MESSAGE

This is a continuation of application Ser. No. 459,853, filed Jan. 2, 1990, now abandoned.

BACKGROUND OF THE INVENTION

This invention relates to a selective call receiver, such as a pager, having a display for displaying information including received messages and having user operable input means for controlling functions of the pager.

Summary of the Prior Art

Existing pagers, such as the PMR2000 manufactured by Motorola Inc., operate in a manner in which an incoming message halts the current operation of the pager to notify the user of a message which is being received. All switches are inactivated, message reading is halted and there is usually a fixed message displayed such as "message" or "1 —page". This becomes very disruptive for the pager user since control of the pager is removed during an incoming message.

The problem is most accentuated when messages are being received by the pager very frequently, such as is the case in "maildrop". Maildrop is a term used for information service messages, usually generated by automated information service systems, such as stock exchange information, sports scores, news items, weather information, etc. Since maildrop messages are updated as frequently as every few minutes the current disruptive operation of pagers becomes very noticeable. Indeed, since a maildrop message may comprise much more data than a pager screen is capable of displaying, it is currently necessary to step through a maildrop message screen-by-screen before the entire message can be read. If each screen is allowed to remain for 1.5 seconds, before the next screen is displayed, it can readily be seen that an entire maildrop may take many seconds to read. The user can find that he is unable to reach the end of one incoming message before it is updated and removed from the pager screen.

It is also the case with existing maildrop systems, that there is much repetition of information from one maildrop to the next. In particular, existing maildrop systems transmit heading and numerical data together, when in fact from one maildrop to the next only the numerical data changes, such as prices of stocks or scores of teams. This is costly in terms of air time and system throughput.

SUMMARY OF THE INVENTION

According to the present invention, a selective call receiver is provided comprising receiving means for receiving radio messages, a display for displaying information including received messages, user operable input means for controlling functions of the receiver, and storage means for storing messages received, the selective call receiver further comprising means for storing an incoming message without substantially interrupting operation of the display and/or the input means. The selective call receiver is preferably a pager.

The invention allows a message or a message update to be received without disturbing the user if a message is being read or another operation is being performed on the pager. The pager can decode and store the message and wait until after the current operation taking place is completed before notifying the user of the fact that an incoming message has been received. The user can be notified that the current message being read has been updated while the user is still reading the message being displayed. This can be accomplished by issuing an audible alert, or providing a visual indication. The visual indication could be a character on the last display screen of the message being read or it could be a discrete LED.

This non-disruptive incoming message avoids the problems associated with mail-drop messages being constantly updated throughout the day. The invention also provides the ability to see information updated while the pager is being read. If a maildrop message is being updated, the old information is being overwritten by the new incoming information. The user should see no major change in his operation (other than, for example, slowing of read advancing of display screens) but the user will see the new information as it overwrites the information currently being examined.

The invention is not restricted to maildrop messages, but can be applied to regular messages.

There are a number of ways of implementing the invention. The pager can be arranged to primarily look at the message coming in, and on the basis of the nature of that message (e.g. maildrop or regular) decide whether to interrupt the screen. Alternatively, it can look at the screen and decide, based on whether a message is being displayed and/or the nature of that message (e.g. maildrop or non-maildrop; maildrop message, regular message or other information) whether to interrupt the screen. In general, a combination of both of these approaches will be used. In particular, if a maildrop message is coming in and a maildrop message is being displayed, then a problem arises which the pager must resolve. That problem is that it is preferred that the message being displayed is not interrupted, but if the incoming maildrop message is an update of the displayed message, then the displayed message must be interrupted because out of date information is being displayed.

One basic implementation of the invention would comprise the steps of storing the incoming message without displaying it and giving the user an indication (visual, audible or vibratory) that a message has been received. This implementation would not necessarily take any account of the nature of the incoming message or what, if any, message is being displayed.

A slightly more refined implementation of the invention would comprise the steps of determining whether information is being displayed on the display and selectively displaying the incoming message only if the display is clear.

Another implementation of the invention would comprise the steps of determining whether the incoming message comprises a first (e.g. regular) or a second, different (e.g. maildrop), type of message and interrupting any information being displayed by displaying the message only if it comprises the first type of message.

In a preferred embodiment of the invention, the pager compares the incoming message with a displayed message and, based upon such a comparison, determines whether to interrupt the displayed message and display the incoming message.

In prior art pagers, the disruption of the pager display allows the pager to reorganize its memories and store the incoming page. In order to implement the current invention, the problem of providing memory location for an incoming message without deleting normal and potentially important messages must be addressed. This is discussed hereinafter.

In accordance with a further aspect of the invention, a selective call receiver is provided comprising: a display arranged simultaneously to display first and second sets of data items; means for receiving a data message including a new first and/or second set of data items; means for updating said first and second sets of data items displayed in accordance with new first and second sets of data items received and means for updating said second set of data items displayed in accordance with a new second set of data items received, independent of said first set of data items displayed.

By virtue of this further aspect, the invention has the following further advantages: it provides for the sending of blank forms or tables to a pager which may be filled in by further communication or by the user; multiple forms may be stored in the pager for use as and where needed; only the information necessary to fill in the forms or tables need to be transmitted to the pager; only a part of the information within a form need be changed; large tables may be displayed in an optimum manner on a small display with the possibility existing for selecting only the necessary data from a received string and tabulating this data; and the efficiency of use of the communications channel is increased. All of the above advantages may be derived with a limited simple command set.

DETAILED DESCRIPTION OF THE PREFERRED EMBODIMENT

In order to best illustrate the utility of the present invention, it is described in conjunction with a communication receiver, such as a paging receiver, capable of receiving and decoding selective call signals, the selective call signals including at least one data message. While the present invention is described hereinafter with particular reference to a paging receiver, it is to be understood at the outset of the description which follows, that it is contemplated that the apparatus and method, in accordance with the present invention, may be used with numerous other communication receivers.

The paging receiver herein is associated with a paging system having a base station terminal. The receiver responds to control and data information from the base station terminal, and in turn stores and provides data messages to a user during operation.

Figure 1:
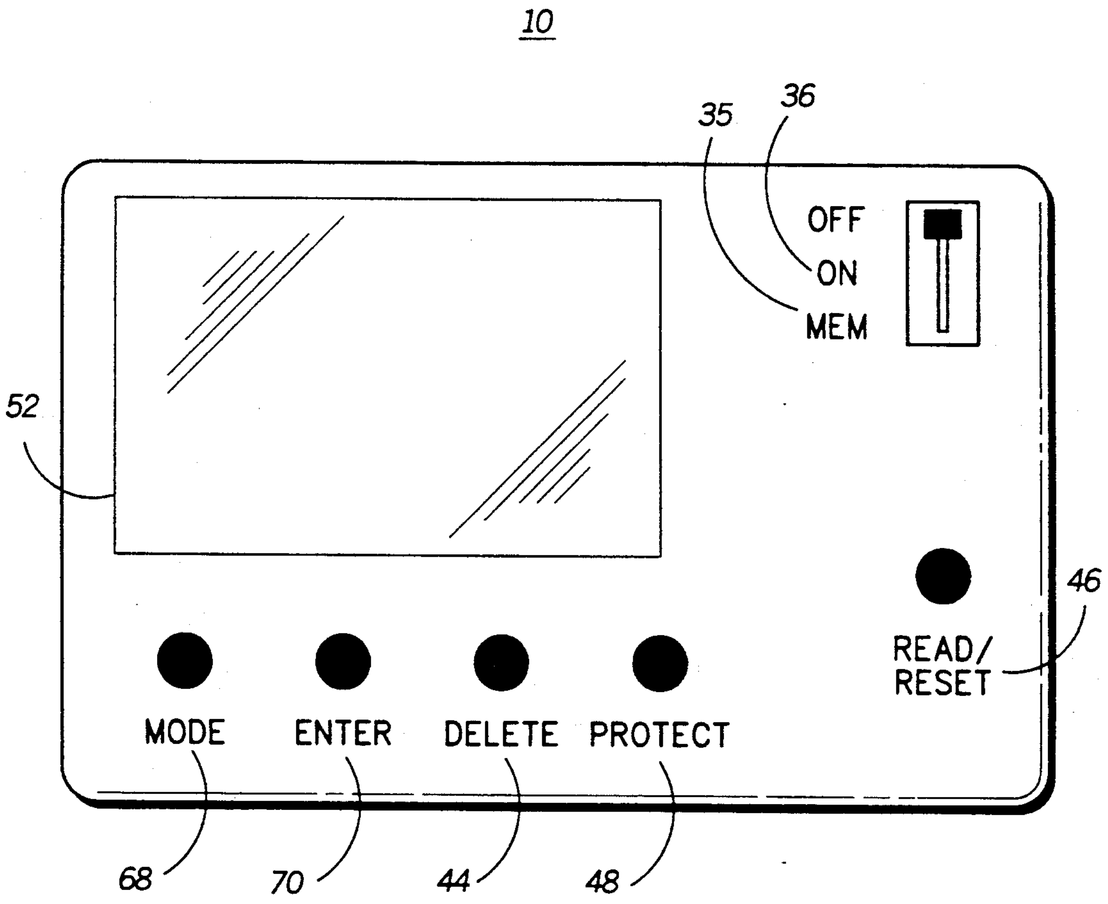
FIG. 1 shows an illustration of a paging receiver (pager) in accordance with the present invention.

FIG. 1 illustrates a paging receiver 10, according to the present invention, capable of storing messages and having a message display 52, and a plurality of operating switches 35, 36, 44, 46, 48, 68, 70. The operating switches provide input signals to operate the paging receiver 10 as described with reference to FIG. 2. The message display 52 provides the user of the paging receiver with the capability of displaying any one of a plurality of messages stored in paging receiver 10.

Figure 2A:
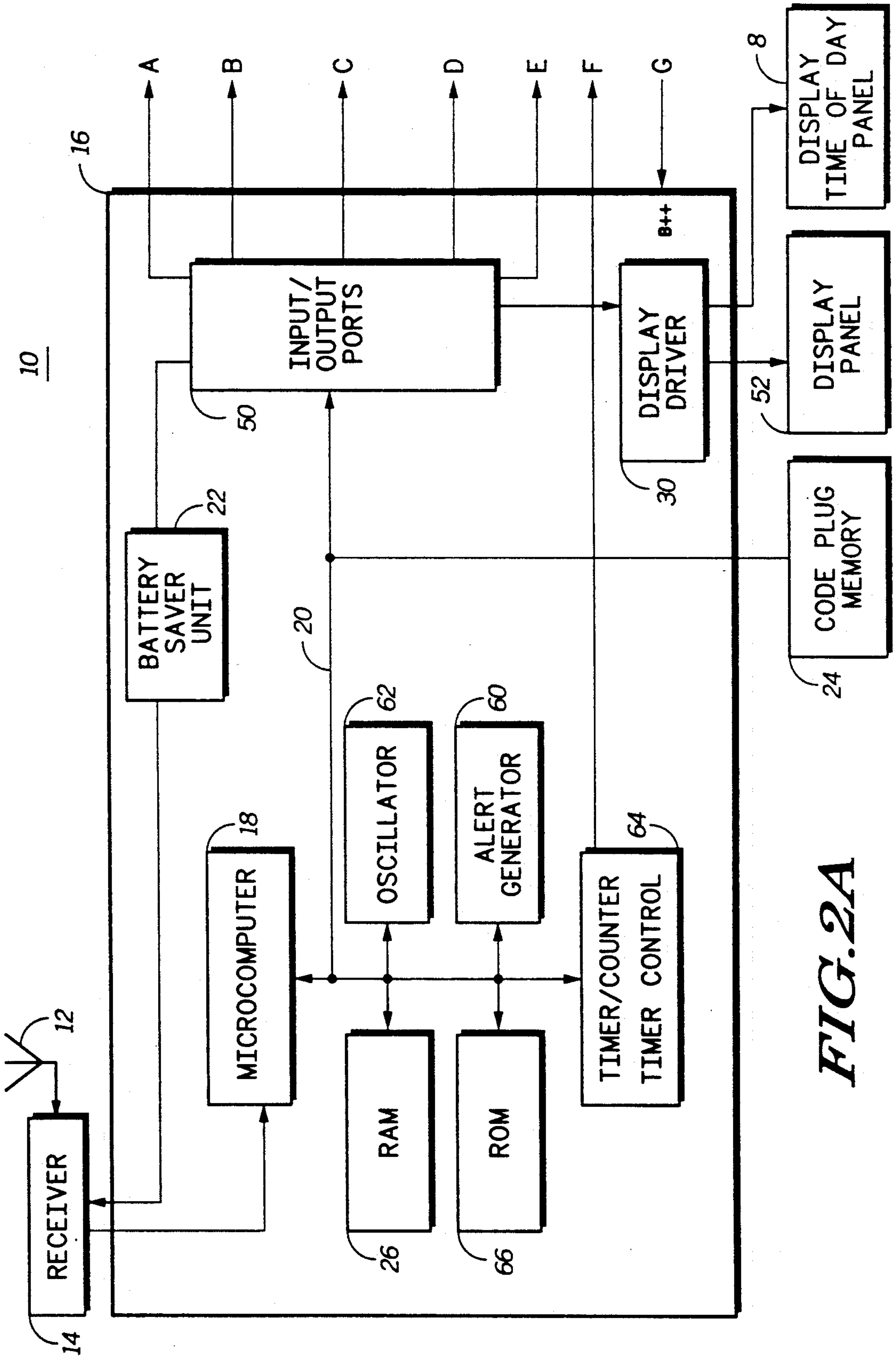
FIGS. 2A, B are a functional block diagram of the pager of FIG. 1.
Figure 2B:
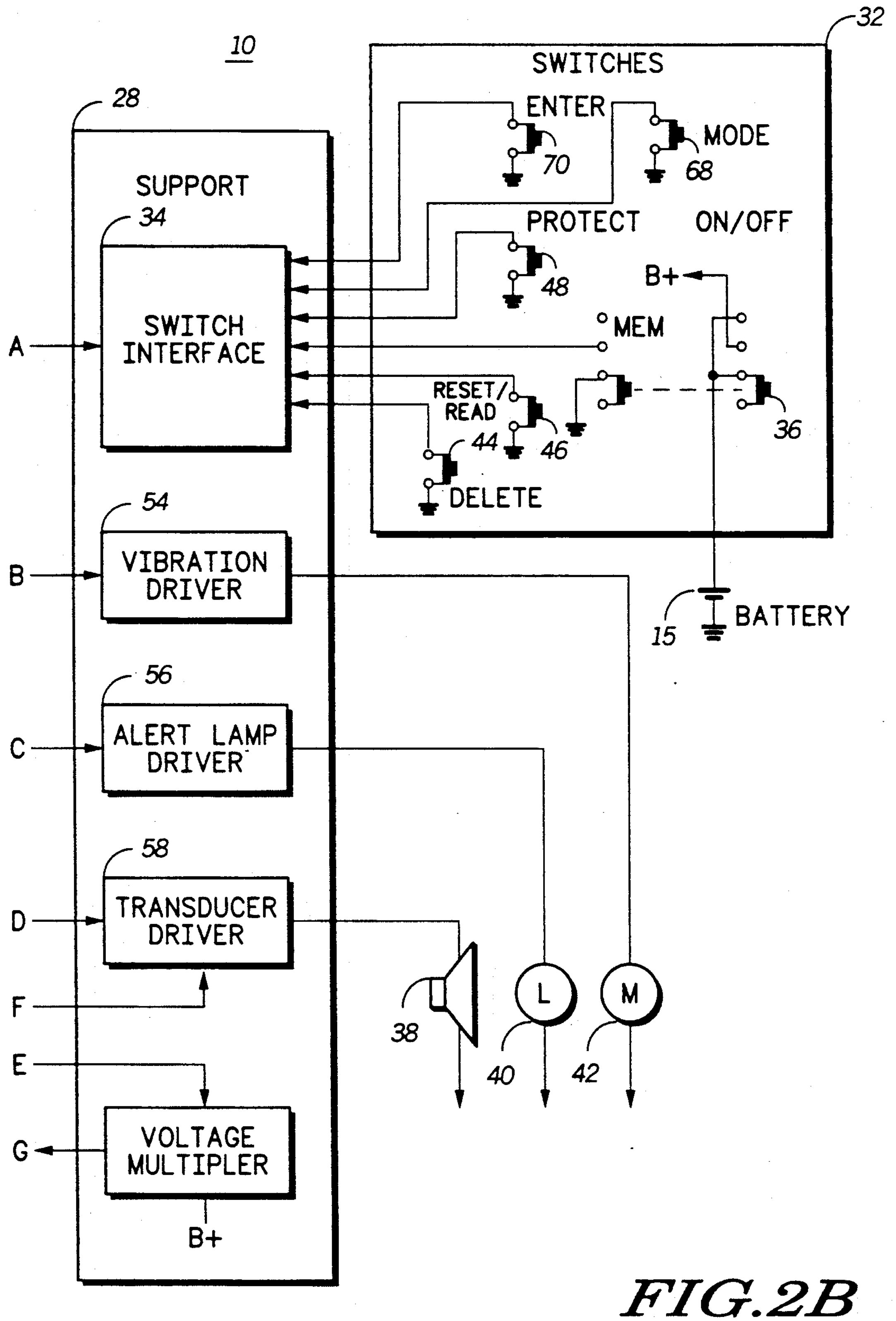

FIG. 2 is a functional block diagram of paging receiver 10 employing the present invention. An antenna 12 is shown coupled to a receiver 14. Receiver 14 detects and demodulates signals transmitted from a remote location over a radio frequency communication link. The output of receiver 14 is coupled to an analysis and decoding system block 16 typically known as a decoder. More particularly, the output of receiver 14 is coupled to a microcomputer controller 18. Microcomputer 18 includes a common bus designated as 20 which is used to couple it to a variety of additional devices. Any of a number of microcomputers would be suitable, but a preferred device is an MC146805C4 or MC68HC11A8 microcomputer manufactured by Motorola, Inc.

Receiver 14 outputs signals to microcomputer 18 which has an address decoder for comparing received address words with an address contained in a code plug memory 24 to determine if the particular paging receiver has been activated and to prevent the paging receiver from functioning if it has not been activated. Basically, the code plug memory 24 is operatively coupled to the microcomputer 18 such that when receiver 14 receives paging codes and corresponding selective calling signals, the microcomputer 18 actuates the code plug memory 24 and reads the unique coded contents thereof. If the received paging code matches the unique paging code stored in code plug memory 24, then the selective calling message associated with the received paging code is stored in memory means 26.

It is noted that the paging receiver in FIG. 2 has the capability of storing selective call message signals in memory 26 or providing them to a support unit 28 or a display driver 30 for readout according to the state in which a plurality of switches 35,36,44,46,48,68 and 70 of switching means 32 are set. A switch interface 34 provides I/O capability between switching means 32 and microcomputer 18. More specifically, the switching means 32 includes switches 44, 46, 48 to control the storage, protection and retrieval of messages stored in memory 26, and switches 68 and 70 to control entering future alert information into the paging receiver 10. For example, switch 44 allows the user to delete a message from a memory location included in memory means 26, switch 46 allows the user to read a particular memory location in memory means 26, and the protect switch 48 permits the user to select a protected message location included in memory 26 from being destroyed. Switch 68 is used to set the paging receiver to one of a plurality of operating modes or states and switch 70 permits data to be entered into the paging receiver.

Microcomputer 18 decodes the address data in a known fashion and compares the results with the predetermined address contained in code plug memory 24 to produce output signals to process the message data, to store the message data, and to alert the user that a message has been received. Microcomputer 18 communicates through bus 20 with other elements of the paging receiver via input/output ports 50. One of the output signals from the microcomputer 18 is supplied to display driver 30 to produce an alphanumeric display of the data on message display panel 52. Other output signals are supplied to support unit 28 to selectively enable a vibrator driver 54, an alert lamp driver 56, or a transducer driver 58. Other signals are applied to battery saver unit 22 and switch interface 34. Microcomputer 18 also controls an alert generator 60 which causes tones produced by transducer driver 58 to be applied to speaker 38.

A clock signal derived from an oscillator 62 is applied to the microcomputer 18 to control the rate at which the signals, including the data messages, are processed as is well known in the art. Timer control 64 provides microcomputer 18 with time and interrupt information in a manner well known in the art. The time information is used to process the data according to the flow diagrams in FIGS. 3 and 6. The microcomputer 18 is coupled by a data bus 20 to read only memory 676 and by data bus 20 to random access memory 26. The RAM 26 includes a plurality of message storage areas and is adapted to store the data message which microcomputer 18 converts from the received encoded paging information signals and to process these signals, including decoding, and to store the data messages in designated memory location areas of RAM 26. The programs or routines to operate microcomputer 18 according to the present invention are stored in ROM 66 and are explained generally with respect of FIGS. 3–6.

Data messages are received, decoded and are stored by microcomputer 18 in message storage areas of RAM 26. The messages can be retrieved by the user by notifying microcomputer 18 through the process of activating the read switch 46 to read an appropriate memory storage area to display the message via display driver 30 on display panel 52. Once the message is stored in memory, the paging user may desire to continue such storage and to defer message readout. Alternatively, the user may desire to interrogate RAM 26 to determine if any message has been stored therein while a later readout function is selected by means of switches 35 and 36. To initiate such interrogation to read out of RAM 26, the paging user activates switch 46 to cause the microcomputer 18 to read a memory location out of RAM 26. The subsequent activation of read switch 46 causes microcomputer 18 to step through the plurality of memory storage areas displaying their contents. In addition, after reading the data message, the user can either delete the message by activating the delete switch 44 or protect the message from destruction by activating the protect switch 48. Additionally, mode switch 68 allows the user to enter time information with respect to the selected message to remind the user of an important event. The enter switch 70 permits the user to appropriately select and modify time input for generating future alerting information.

It is noted that the description of the pager operation given above is general in nature. More details of a pager operation are found in U.S. Pat. No. 4,412,217 entitled "Pager with Visible Display Indicating Status of Memory" assigned to the present assignee, which disclosure is hereby incorporated by reference.

The following flow charts refer to the operation of microcomputer 18. Other routines for the operation of the paging receiver are included in ROM 66, however, such routines are not described herein since they are not needed for the understanding of the present invention.

Figure 3A:
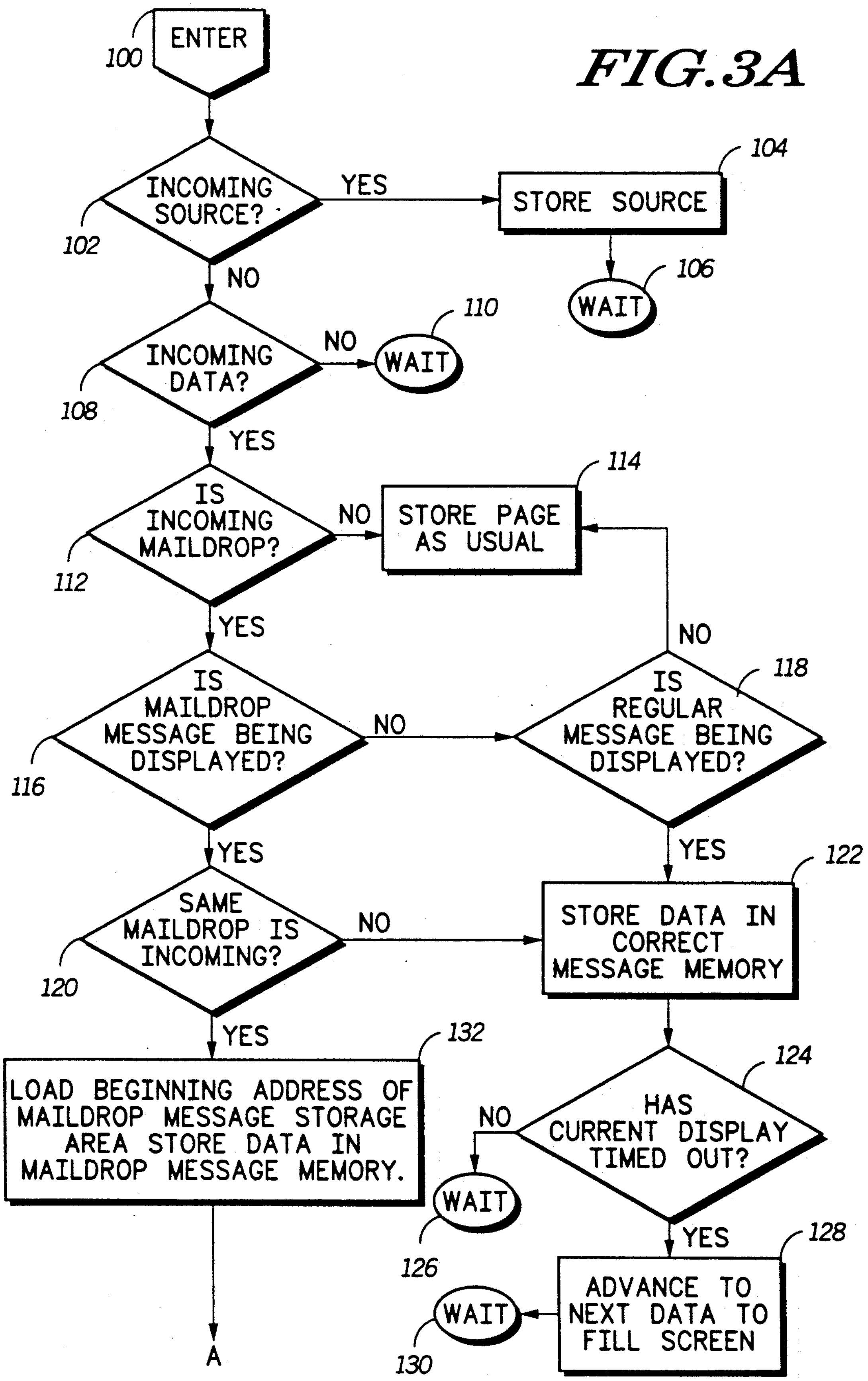
FIGS. 3A, B are a flow diagram showing operation of the pager of FIG. 1 in accordance with a first embodiment of the invention.
Figure 3B:
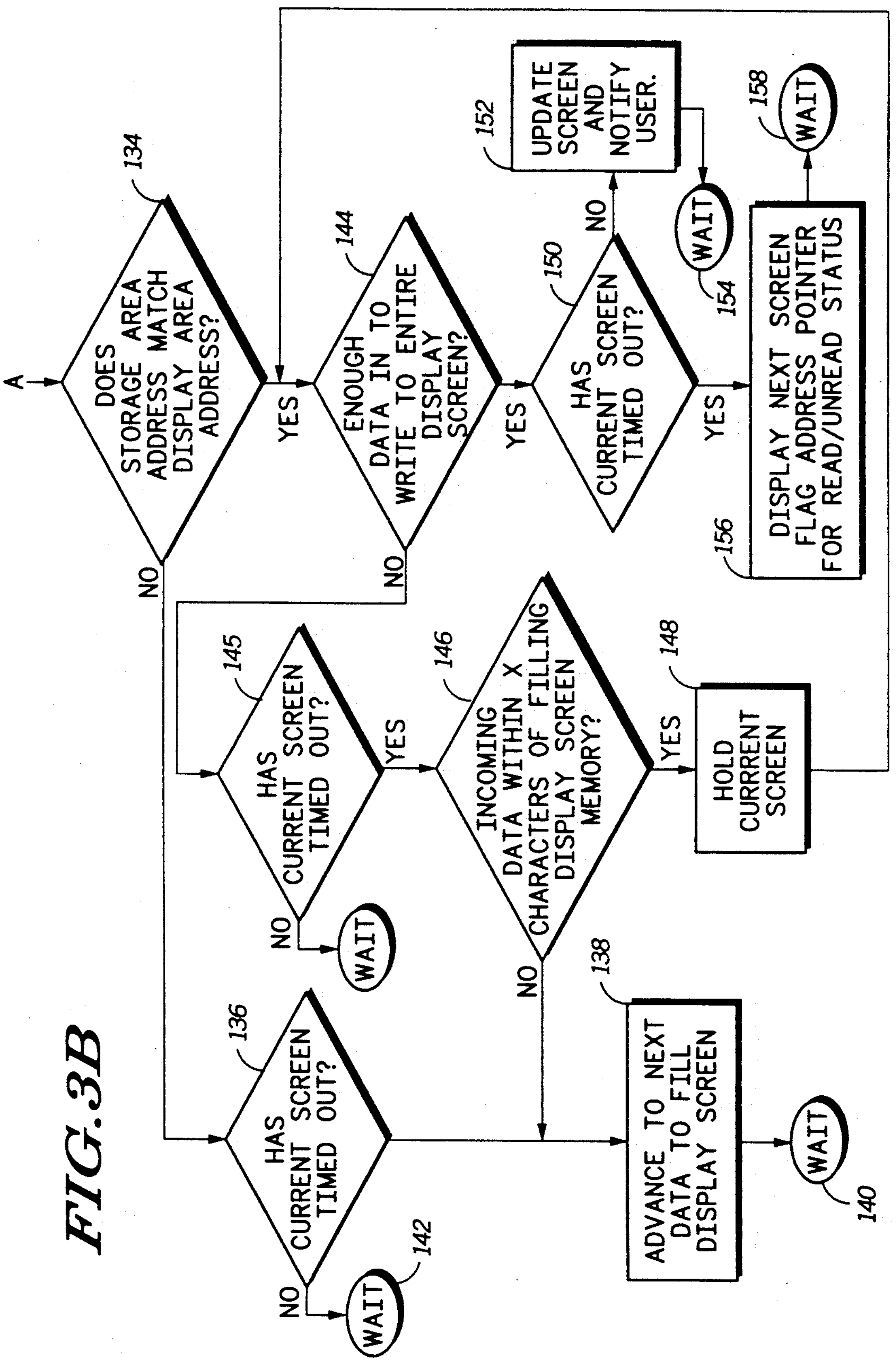

FIG. 3 illustrates a flow diagram of the operation of the paging receiver (pager) of FIGS. 1 and 2 in accordance with a first preferred embodiment of the invention. This embodiment provides automatic updating of maildrops and non-disruptive operation of the pager on the maildrop receipt, while non-maildrop (i.e. regular) messages are received with normal interruption of the pager operation as in prior art pagers.

For each incoming character of a paging signal received by receiver 14, the program of FIG. 3 is entered at step 100. At step 102, the character is checked to determine whether it is incoming source. In this context, "incoming source" refers to the address/code to which the pager in question is programmed to respond (the program address/code generally being stored in the code plug 24), plus any sub-address which controls the pager function. If this is detected, the program passes to step 104 where the source, in particular the sub-address, is stored. A GOLAY pager can typically receive 16 addresses, of which up to four are typically allocated for maildrop messages. One of those four addresses, when received, will identify a maildrop message. A selection of sources is given in the following table for illustration.

TABLE 1

| | Address | Priority | Decode type | |
|---|---|---|---|---|
| 1 | 0001 | 0 | 101 | alphanumeric page |
| 2 | 0010 | 0 | 101 | alphanumeric page |
| 3 | 0011 | 0 | 100 | numeric page |
| 4 | 0100 | 0 | 001 | tone-only page |
| 5 | 0101 | 1 | 001 | tone-only page |
| 6 | 0110 | 1 | 011 | voice page |
| 7 | 0111 | 1 | 100 | numeric page |
| 8 | 1000 | 0 | 101 | alphanumeric page |

The source comprises the address part (which is a subaddress of a larger address), the priority bit and the decode type indicator. A priority bit of 1 indicates a priority page. For the decode types: 000=non-active address; 001=tone-only page; 011=voice page; 100=numeric page; 101=alphanumeric page.

After step 104, the program is exited at step 106, whereupon the pager waits for the next data block. When the next data block is received, steps 100 and 102 are repeated, and if the character is not incoming source, step 108 checks for incoming data. If no data is yet received, the program continues to wait at step 110. When incoming data is received, the program passes to step 112, which checks whether the incoming data is maildrop data or a regular message. This is determined by the source. Particular addresses are designated maildrop addresses and if the address received is one of these designated addresses, the message is treated as a maildrop.

If the incoming message is not a maildrop, i.e. is a regular message, the program passes to step 114, and the message (page) is stored in memory 26 in a manner known in the art. When a message is stored by virtue of step 114, the storage is carried out independent of a message displayed on display 52. Messages and other information are displayed on display 52 for a maximum period set by a timeout timer. When a message has been displayed for its timeout period, the displayed message is deleted from the display and any page stored by virtue of step 114 is then displayed. In the meantime, from the moment that the page is stored by virtue of step 114, a visual indication is given on LED 40 showing that a page has been received, but has not yet been displayed.

If the incoming message is a maildrop, the program passes to step 116, which determines whether a maildrop is currently being displayed on display 52. If a maildrop message is not being displayed, the program passes to step 118, which determines whether a regular message is being displayed. If neither a maildrop message nor a regular message is being displayed, the program proceeds from step 118 to step 114 described above. If a maildrop message is being displayed, the program proceeds from step 116 to step 120, which determines whether the maildrop message being displayed is the same as the incoming maildrop message. This is also determined by the source stored at step 104, by comparing the source for the received message with the source for the displayed message.

If step 120 determines that the incoming maildrop is not the same as the maildrop being displayed, the program proceeds to step 122. Step 122 is also reached if step 118 determines that a regular message is being displayed. In step 122, the incoming data is stored in message memory, the location in memory being determined in a manner known in the art. When the data has been stored, the program passes to step 124, which checks whether the current display has been displayed for its full timeout period. If not, the program waits at step 126. When the timeout period has expired, the program proceeds to step 128, and a page counter is incremented and the next data to be displayed is identified by the incremented page counter and this data is displayed on the screen (step 128). The next data may be the data stored in step 122, or there may already be data waiting for display. In due course, the data stored in step 122 will eventually be displayed, for example by virtue of step 128. When step 128 has been executed, the program waits at step 130.

Referring again to step 120, if the maildrop being displayed is the same as the maildrop received, the program passes to step 132. At this point, the beginning address of the maildrop message storage area is loaded by the microcomputer 18 and the data is stored in maildrop message memory. Subsequently, in step 134, the storage area address of step 132 is compared with the storage area address of the message currently being displayed. This is necessary because, even if the two maildrops are the same, it is possible to update a portion (a "data field") of the maildrop that is not currently being displayed, however special consideration must be given if the data field (s) currently being displayed include(s) the data field to be updated. In the latter case, it is not possible to update individual characters without the risk of displaying misleading information, but it is important to only update a whole display at once (or one or more whole data fields). As an alternative to comparing the storage area address and the display area address, the program could compare a data field identifier character for the data field of the incoming data with a data field identifier character or characters for the data field(s) being displayed. These characters will be described in greater detail below with reference to FIG. 4.

If the storage area address and the display area address are not the same, the program proceeds to steps 136, 138, 140 and 142, which are the same as steps as 124, 128, 130 and 126 respectively.

If step 134 determines that the two addresses are the same, the program proceeds to step 144. Step 144 determines whether enough data has been received to write an entire display screen of data. If insufficient data has been received, the program proceeds to step 145 and if the screen time-out period has not yet expired, the program waits for the rest of the data. If the time-out period has expired, the program proceeds to step 146, which determines whether the number of characters received falls short of a full screen by a predetermined number of characters (X) e.g. one or two characters. If step 146 determines that more than X characters are required to provide a complete display screen, the program passes to step 138. If, on the other hand, the result of the test of step 146 is positive, the program passes to step 148, the current screen is held and the program returns to step 144. The reason for steps 146 and 148 is because the data arrives at a much greater rate than can be displayed, so that if only a few characters are required to complete a display, it is worth waiting for the short time necessary to receive the additional characters. Alternatively, the current screen could be held irrespective of how many more characters are required to fill a new screen. When enough data has been received to write an entire display screen, the program passes from step 144 to step 150, and if the current screen has not yet timed out, the program passes to step 152 and the display is updated immediately and an indication is given to the user informing him that the display has been updated. The indication may be an LED or an audible tone. The effect of this is that the data displayed changes as the user is viewing it. After step 152, the program proceeds to step 154, and waits for the next page to be received. If the current screen at step 150 has already timed out, the program proceeds to step 156 and the next screen is displayed and the address pointer for the received screen is set at unread, while the address pointer for the screen being displayed is set from unread to read status. Finally, step 158 is reached and the program waits for the next interrupt.

Figures 4, 5A, 5B:
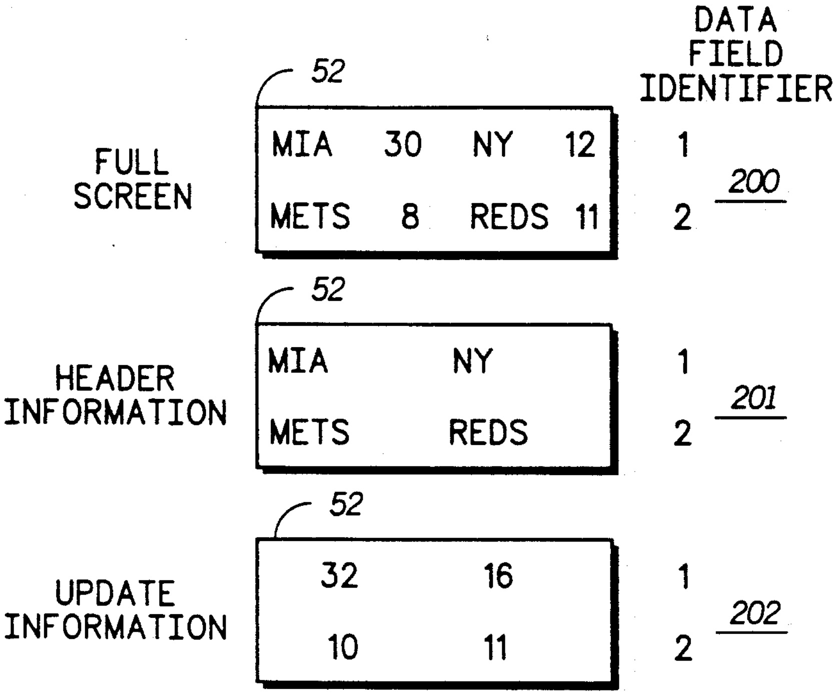
FIG. 4 shows information being displayed on the display of the pager of FIG. 1 in accordance with a second embodiment of the invention.
FIGS. 5A and 5B shows the information of FIG. 4 as it is organized in the memory of the pager.

In the above embodiment, as described with reference to FIG. 3, all maildrop messages are treated equally, irrespective of type of maildrop (e.g. sports scores, stock exchange prices, weather information etc.), and irrespective of whether the maildrop comprises numeric data or alphanumeric data. In a somewhat more complex embodiment, maildrop messages are divided into header information and update information, and a full screen of data comprises both header and update information. This is illustrated in FIG. 4. Referring to that figure, a full screen of information is shown on display 52, and beneath this are shown header information and update information, as they would appear on display 52. The full screen 200 comprises the data of the header information 201 and the update information 202 superimposed on each other. In accordance with the present invention, the header information and the update information can be changed individually, independently of each other. In most cases, the update information will be changed independently of the header information, while the header information would not normally be changed without also changing the update information. The advantage of the present invention is that when there are a number of updates received which correspond to a single header data field, then transmission of the header information together with the update information is not necessary, but instead the update information can be transmitted on its own, thus increasing throughput and reducing the use of air time. This is particularly the case when the update information is purely numeric.

A full screen of information comprises two lines, each line having a data field identifier, which is shown on the right of FIG. 4. There may be a large number of lines of information, each having its own data field identifier. The information can be stored in separate memory locations as shown in FIG. 5. FIG. 5A shows one possible memory layout for the header information. FIG. 5B shows a corresponding layout for the update information.

Referring to FIG. 5A, it has been shown that the header information MIA/NY has been given a format designated as 1.9. The symbol "/" is used here to divide the header information into two sub-fields, the first sub-field commencing at position 1 and the second sub-field commencing at position 9. In FIG. 5B, the update information 30/12 has been allocated the format "+1, the symbol "+" here being used to indicate that the update information should follow the corresponding header information with a single space therebetween. When the header information of data field 1 of FIG. 5A is combined with the update information data field 1 of FIG. 5B, the result will be the first line of display text shown in FIG. 4. Many other ways could be devised of storing the header and update information in a manner which ensures that header and update information are not displayed on the same character position on the screen.

Figure 6A:
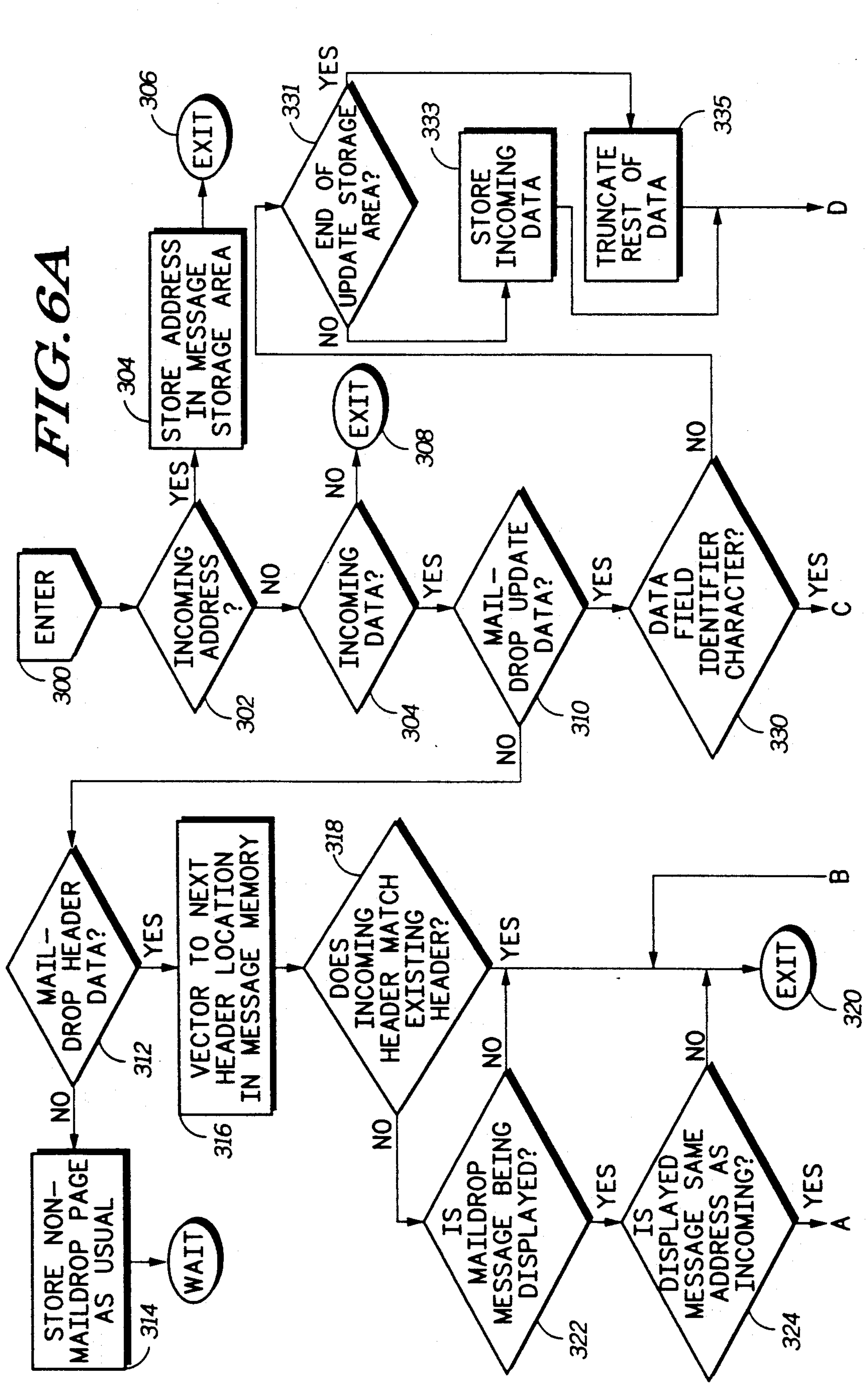
FIGS. 6A, B show a flow diagram of the operation of the pager of FIG. 1 in accordance with a second embodiment of the invention.
Figure 6B:
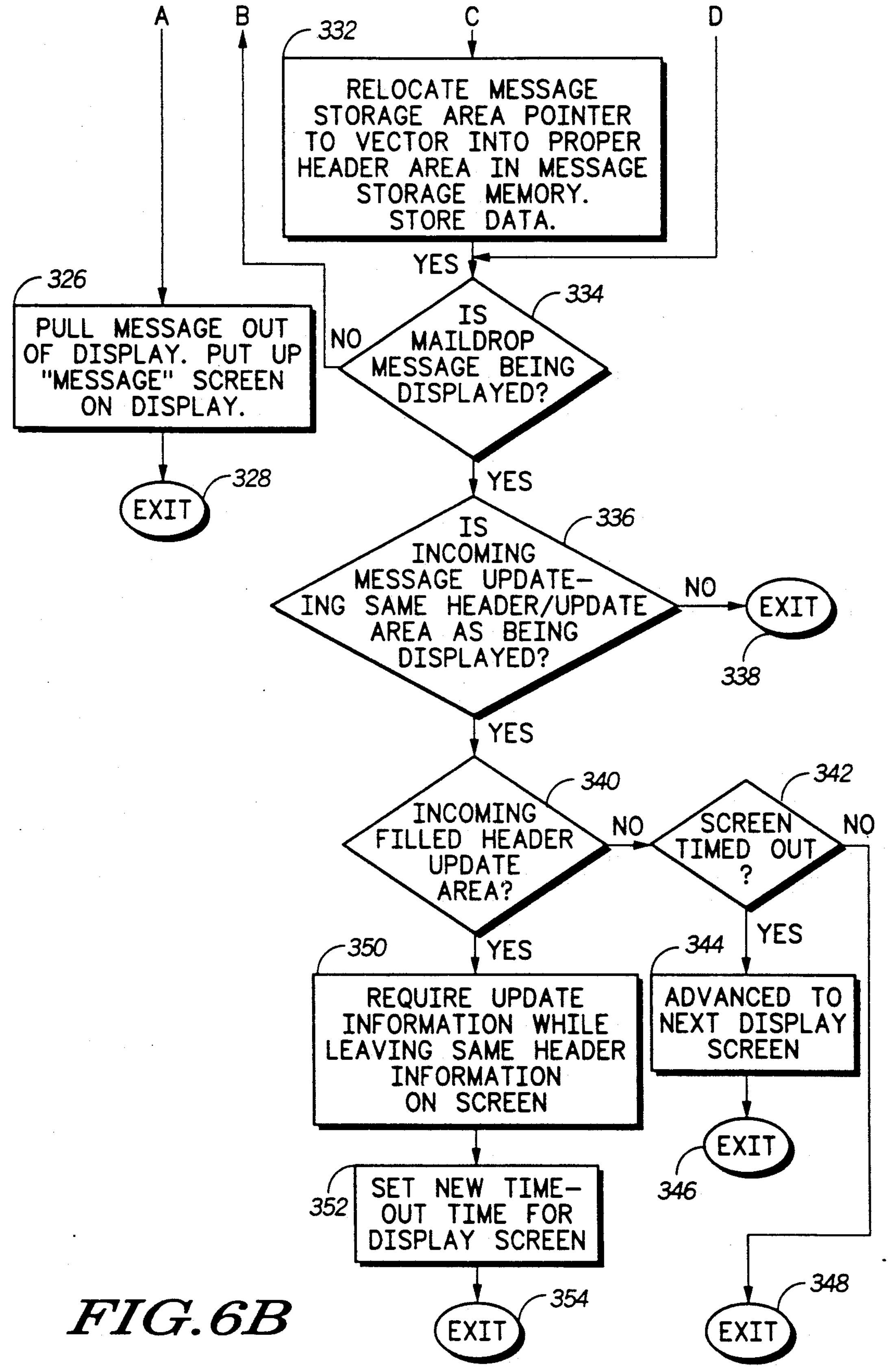

FIG. 6 shows a flow diagram of a program for microcomputer 18 which controls the separate updating of the header and update information. The program starts at step 300, and at step 302 an incoming signal is checked for an incoming source, as for step 102 of FIG. 2. If the correct source is identified, this is stored in step 304, and the program is exited at step 306, for re-entry at step 300. If no address is found in step 302, the signal is checked for incoming data in step 304. If no such data is found, the program is exited at step 308. When incoming data is determined as being received, step 310 is reached, and step 310 determines whether the incoming data is maildrop update data or other data, in a manner similar to step 112 of FIG. 3. If the incoming data is not update data, then step 312 determines whether it is header data. If it is not header data, then the data is assumed to be a regular paging message, and is stored in step 314 in a manner known in the art. If the data is indeed header data, then the program vectors to the next header information in message memory at step 316, and at step 318 it checks whether the incoming header matches the existing header at that location. If there is a match, then there is no need for further action and the program exits at step 320. If there is no match at step 318, then step 322 determines whether a maildrop message is currently being displayed, and if not, then there is no need for further action. If, on the other hand, a maildrop message is being displayed, step 324 determines whether it is the same message as the incoming maildrop message, if not, then again there is no need for further action, but if so then the whole structure of the message that the user is currently reading is being changed, and it is necessary to delete the message from the display, and indicate that a new message has been received. This is done at step 326. It is not possible merely to change the header information without changing the update information because the combination will not fit and would make a nonsense. After step 326, the program exits at step 328.

Referring back to step 310, if the incoming data is update data, then the program looks at the data field identifier character in step 330. This is the data field identifier shown in the first column of FIG. 5A and 5B, and indicates the line of data being updated. When a data field identifier character is identified, the program passes to step 332 and vectors into the appropriate area in the message storage memory, in order to store the new updated data in that storage area. The storage of the data is carried out in steps 331,333, and 335. After step 332, the program determines whether the updated message is currently being displayed (step 334). This step checks whether the data at the memory storage address determined by the data field identifier character in step 332 (or the data stored at the memory storage address of the data stored in step 333) is currently being displayed. If this data is not being displayed, there is no need for further action and the program passes to step 320. On the other hand, if this message is being displayed, the program passes to step 336 which checks whether the incoming message is updating the same header/update area in memory as the area of the data being displayed. If it is, then this means that the user is viewing data which is already out of date, and the program passes to step 340, where the program determines whether enough data has been received to fill the header update area in question. This is necessary because the screen cannot be updated until the whole screen can be updated (otherwise misleading data would appear on the screen). If insufficient data has been received, the program passes to steps 342, 344, 346, and 348, where it advances to the next display screen if the existing screen has already timed out, and exits if it has not. Assuming the answer to the test of step 340 is positive, the program passes to step 350, where the update information is rewritten onto the screen, while leaving the same header information on the screen. What the user sees at this point is, in the case of the screen of FIG. 4, the scores change while the names of the teams remain the same. After step 350, step 352 is reached, where the timeout time for the display screen is reset in order to give the user this full amount of time to see and comprehend the change of information. Finally, the program is exited at step 354.

The embodiment of FIG. 6 provides for automatic updating of numeric data on fixed headers in a maildrop message. This aspect of the invention will now be described in further detail in relation to a generalized maildrop system.

In general terms, data is divided into fields which may separately be given protected or unprotected status and may contain header information or update information. In particular, header fields will generally contain alphanumeric data and be given protected status and update fields will generally be given unprotected status. The effect of data having "protected status" is that such data will not be overwritten by new incoming data. In a given system, an update field may contain only numeric data. This allows for the transmission of update fields of purely numeric data, which for maildrop purposes is advantageous because it increases the throughput of update fields. It is intended that update fields are transmitted many times more frequently than header fields.

In the following description, the two types of field will simply be referred to as protected and unprotected fields, though it will be appreciated that the description is not restricted to this distinction.

Formatting techniques are used for the sending and receiving of repetitive forms of data. This is particularly useful with broadcast teletext type of data.

Various levels of formatting can be used when using teletext type broadcast transmissions. The simplest of these is to employ protected and unprotected fields.

In this concept, field titles or designators are sent to the pager periodically (e.g. once every two hours). These titles or designators form the protected fields and are semi-permanently stored in the pager memory assigned to a particular set of teletext data. The data which changes regularly comprise the unprotected fields. A new set of unprotected fields is transmitted without designators, with each field being separated from the next by only a carriage return symbol. Upon reception of a new message, the pager clears all unprotected fields and inserts new data. The new data is interspersed with titles/headers from protected fields and displayed on the pager display. The reader cannot tell that the titles were not sent with the data.

A simple example is as follows. Eleven fields of data are to be sent to a pager. This data will be updated every 15 minutes starting at 10 AM. The average length of a title is 6 characters, the average length of the data is 5 characters. The first field is time and it is unlabeled. Control characters used are Shift P (here designated as P) for protect, Shift U (U) for unprotect, and (CR) for carriage return.

At 9:45 AM the following message is sent to the appropriate address, viz.:

UP (field 2)UP (field 3)U.-.-.-.-.P (field 11)U.

This message records the protected fields in the pager.

At 10:00 AM, the first message goes out:

10:00 AM (CR) (data 2) (CR) (data 3) (CR) - - -(data 11)

Each data field is inserted behind a U and before a P so that the memory now contains:

U10:00 AMP (field 2)U(data 2)P(field 3)U(data 3).-.-.-.-P(field 11)

The pager displays this data as:

10:00 AM
field 2 (space) data 2
field 3 (space) data 3
field 11 (space) data 11

We claim:

1. A selective call receiver comprising:

receiving means for receiving messages of either a first type or a second, different, type;

display means for displaying information including said messages;

user operable input means for controlling functions of the selective call receiver;

storage means for storing said messages; and control means coupled to said receiving means, said display means, said input means and said storage means for controlling the storing of said messages and the operation of the display means and the input means, wherein said control means determines whether a received message comprises said first type or said second type of message and, in response to the determination, interrupts the operation of said input means and said display means in order to display the received message if the received message comprises the first type of message or stores the received message without substantially interrupting the operation of said input means and said display means if the received message comprises the second type of message.

2. The selective call receiver of claim 1 further comprising indicator means for providing an indication that a message has been received but has not yet been displayed on the display if the message comprises the second type of message.

3. The selective call receiver of claim 1 wherein said control means comprises:

means for determining whether information is being displayed on the display when a new message is received; and means responsive to said determining means for selectively displaying the new message if said new message comprises the second type of information and if no information is being displayed when said new message is received;

4. The selective call receiver of claim 3, wherein said means for selectively displaying the new message displays the new message if no information comprising one of said messages is being displayed.

5. The selective call receiver of claim 1 wherein said control means further comprises:

means for comparing said received message with a displayed message; and means responsive to said comparing means for selectively interrupting the displayed message by displaying the received message.

6. The selective call receiver of claim 5 wherein said received message comprises said second type of message and wherein said means for comparing determines whether said received message is an update of said displayed message and said means for interrupting interrupts the displayed message by displaying the received message in response to said received message being an update of said displayed message.

7. The selective call receiver of claim 2, wherein said display means comprises a first portion for displaying said messages received and a second portion for displaying other information, wherein said second portion includes said means for indicating.

8. A selective call receiver comprising:

a display arranged simultaneously to display first and second sets of data items;

means for receiving a data message including a new first set and/or second set of data items;

means for updating said display of said first and second sets of data items such that said first and second sets of data items are displayed in accordance with said new first and second sets of data items if said display is displaying said first and second sets of data items corresponding to said new first and second sets of data items when said new first and second set of data items are received; and means for updating said display of said first and second set of data items such that said second set of data items are displayed in accordance with said new second set of data items, independent of said first set of data items displayed, if said display is displaying said second set of data items corresponding to said new second set of data items when said new second set of data items are received.

9. A method of displaying information on a selective call receiver comprising a display and a memory device, the method comprising the steps of:

receiving first and second sets of data items;

storing said first and second sets of data items in said memory device;

displaying said first and second sets of data items simultaneously on said display;

receiving a new second set of data items;

updating said second set of data items stored in said memory device in accordance with said new second set of data items; and updating said second set of data items on said display in accordance with said new second set of data items while continuing to display said first set of data items if said first and second set of data items are displayed on said display when said new second set of data items are received.

10. The method of claim 9 further comprising after the step of storing said first and second sets of data items the step of protecting said first set of data items stored in said memory device from deletion therefrom.

11. The method of claim 9, wherein the data items transmitted comprise commands and data.

12. The method of claim 11, wherein the commands transmitted are selected from a command set which includes a command to treat incoming data as a first or second set of data items and wherein said command causes a first set of data items to be treated as headings for repeated display each time anew set of second data items is received and a second set of data items to be treated as update data for display with said headings.

13. A selective call receiver comprising:

receiving means for receiving selective call signals comprising update signals;

decoding means coupled to said receiving means for decoding said update signals and producing update data in response thereto;

memory means for storing a plurality of periodically updated information blocks;

display means for displaying each of said plurality of periodically updated information blocks in a display;

memory control means for updating one of said plurality of periodically updated information blocks corresponding to said update data in response to said update data; and display control means coupled to said display means and said decoding means for altering said display in response to said update data if said update data is received and decoded while said one of said plurality of periodically updated information blocks corresponding to said update data is being displayed and for not substantially altering said display in response to said one of said plurality of periodically updated information blocks corresponding to said update data not being displayed when said update data is received and decoded.

14. In a selective call receiver comprising a display and a memory, a method for periodically updating information service data comprising the steps of:

receiving periodic update data;

decoding said periodic update data;

updating information service data corresponding to said periodic update data stored in said memory in response to receiving said periodic update data;

determining whether said stored information service data corresponding to said periodic update data is being displayed by said display; and updating said stored information service data on said display corresponding to said periodic update data in response to receiving said periodic update data if said stored information service data corresponding to said periodic update data is being displayed.

* * * * *